United States Patent [19]
Sasaki et al.

[11] Patent Number: 5,844,334
[45] Date of Patent: Dec. 1, 1998

[54] TRACTION MACHINE MOTOR WITH IMPROVED COOLING

[75] Inventors: Kazuhisa Sasaki, Tokyo; Keiichi Kohroki, Aichi-ken, both of Japan

[73] Assignee: Otis Elevator Company, Farmington, Conn.

[21] Appl. No.: 781,948

[22] Filed: Dec. 20, 1996

[30] Foreign Application Priority Data

Apr. 17, 1996 [JP] Japan .................................. 8-094977

[51] Int. Cl.⁶ .................................................. H02K 9/00
[52] U.S. Cl. ........................... 310/58; 310/59; 310/51; 310/64; 310/80; 187/297; 187/289
[58] Field of Search .............................. 310/58, 59, 64, 310/80; 187/277–289

[56] References Cited

U.S. PATENT DOCUMENTS

| | | | |
|---|---|---|---|
| 4,836,755 | 6/1989 | Nitsche et al. ......................... | 417/368 |
| 5,114,317 | 5/1992 | Cohen ..................................... | 417/354 |
| 5,250,864 | 10/1993 | Kusumoto et al. ........................ | 310/58 |
| 5,315,193 | 5/1994 | Kummer et al. ........................... | 310/50 |
| 5,550,418 | 8/1996 | Chung ..................................... | 310/239 |
| 5,561,334 | 10/1996 | Ishida et al. .............................. | 310/62 |
| 5,573,084 | 11/1996 | Hakala ..................................... | 187/252 |

Primary Examiner—Steven L. Stephan
Assistant Examiner—Elvin G. Enad

[57] ABSTRACT

On a traction machine motor wherein both a rotor (6) and a driving sheave (10) are attached on the rotating shaft (5), which is supported by both a motor bracket (1) and a bearing stand (2), and a motor frame (7) which supports the stator (8) is connected to the motor bracket (1), a gap ($G_5$) is provided between a spigot joint (18) which is concentric with the rotating shaft (5) and an arcuate part (19) to indirectly measure a bias in the circumferential direction of the gap ($G_4$).

3 Claims, 3 Drawing Sheets

TRACTION MACHINE MOTOR WITH IMPROVED COOLING

TECHNICAL FIELD

The present invention relates generally to elevators and, in particular, relates to traction machine motors.

BACKGROUND OF THE INVENTION

Traction machine motors are used for raising and lowering elevators. The structure of a conventional traction machine motor is shown in FIG. 3. A rotary shaft (5) is rotatably supported by bearings (3) and (4) between motor bracket (1) on the left end and bearing stand (2) on the right end. A rotor (6) is fastened to the left side of the rotary shaft (5). A motor frame (7) that surrounds the rotor (6) is joined to a motor bracket (1). The motor (9) comprises stator (8), which is provided inside the motor frame (7), and the aforementioned rotor (6). In a middle section of rotary shaft (5) is wound one end of a wire (not shown) as a cable member and driving sheave (10) is fastened there for raising and lowering an elevator car that is suspended on the other end of the wire. A brake (11) for restricting or releasing the rotation of rotary shaft (5) is provided near the right end of rotary shaft (5). A radial weight of, for example, several tons is added to driving sheave (10), and this the support distance between bearings (3) and (4) is set as small as possible to minimize the flexing of the rotary shaft caused by this weight. A blower (12) is provided on top of the motor frame (7) in the motor (9), while a gap is formed between the motor frame (7) and the driving sheave (10) to provide an exhaust hole (13).

Gaps ($G_1$) and ($G_2$) between stator (8) and rotor (6) must be adjusted to be the same in the circumferential direction so that the traction machine motor is centered. The position of bearing (3) relative to base (14) is automatically determined, but the position of bearing (4) is not automatically determined and the thickness of liner (15), which is sandwiched between base (14) and bearing stand (2), is adjusted while measuring the size of gap ($G_2$) in the circumferential direction. To measure the size of gap ($G_2$) along the circumference, a gauge is inserted through multiple measuring holes (16) formed along the circumference of driving sheave (10), because a gauge cannot be inserted through exhaust hole (13).

To cool motor (9), as shown in FIGS. 3 and 4, air that is blown in from blower (12) and forced into motor frame (7) is then discharged into the external air along the central axis of rotary shaft (5) through exhaust hole (13), releasing heat from all parts of motor (9).

Gap ($G_2$) must be measured in order to position bearing (4); however, this measurement is difficult because the distance from the position of bearing (4) and the position at which gap ($G_2$) is measured is large. In addition, it is also difficult to position bearing (4) roughly by sight because there is a driving sheave. It must be positioned by repeatedly measuring gap ($G_2$) and positioning bearing (4), and this will require skill and a large amount of time.

DISCLOSURE OF THE INVENTION

It is an object of the present invention to provide a traction machine motor that facilitates alignment of a rotary shaft.

According to the present invention, a traction machine motor comprising: a rotating shaft having a first end and a second end, said rotating shaft rotating about a rotational axis; a bracket for supporting the first end of said rotating shaft; a bearing stand for supporting the second end of said rotating shaft, said bearing stand having a first end; a rotor disposed on said rotating shaft; a frame surrounding said rotor, said frame having a first arcuate section formed therein; a stator disposed inside said frame; a drive sheave disposed between said rotor and said bearing stand, said drive sheave having a second arcuate section formed therein opposite the first arcuate section of said frame; and a cooling device for cooling said traction machine motor, said cooling device having an intake opening and an exhaust opening both of which being directed toward the rotational axis of said rotating shaft.

BEST MODE FOR CARRYING OUT THE INVENTION

Figure 1:
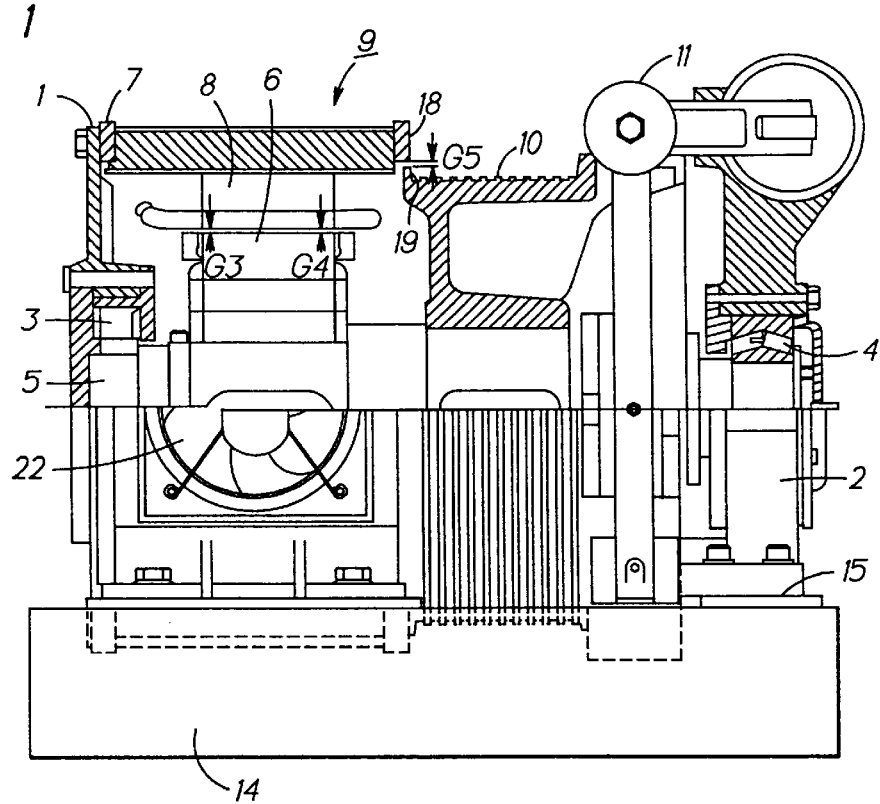
FIG. 1 is a front cross section of a traction machine motor based on the present invention.

The present invention will be explained in detail below based on the application example shown in the figures. Note that this application example improves parts of a conventional traction machine motor. Therefore, the same reference numerals are appended to portions that are the same as conventional portions and explanations of these are omitted. Only different portions will be explained.

Figure 2:
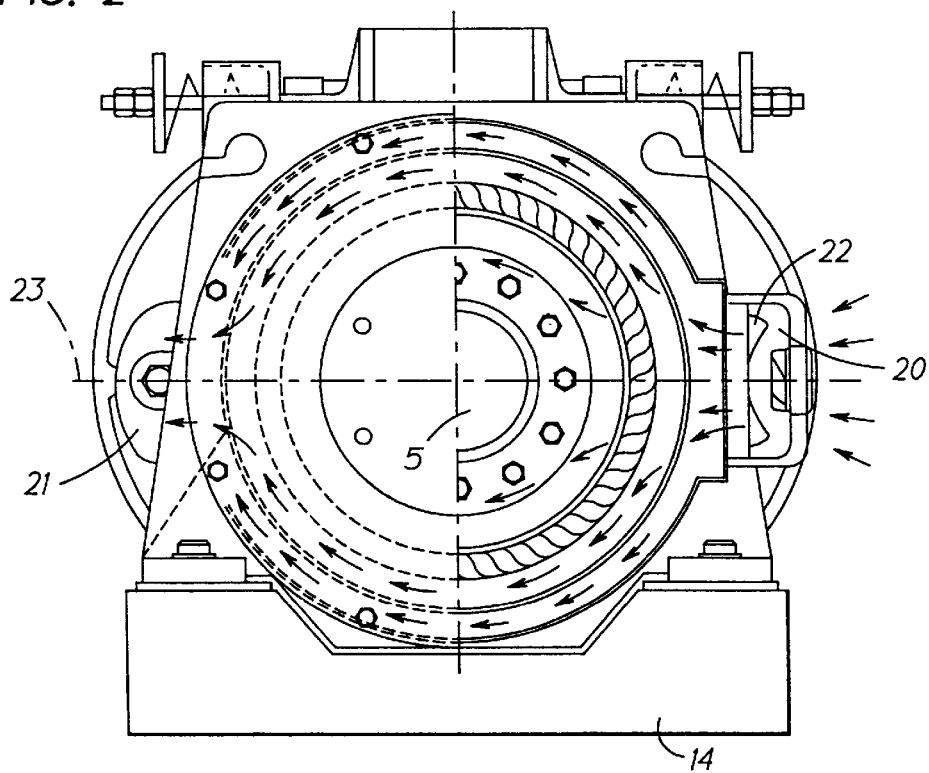
FIG. 2 is a left side cross section of a traction machine motor based on the present invention.
Figure 3:
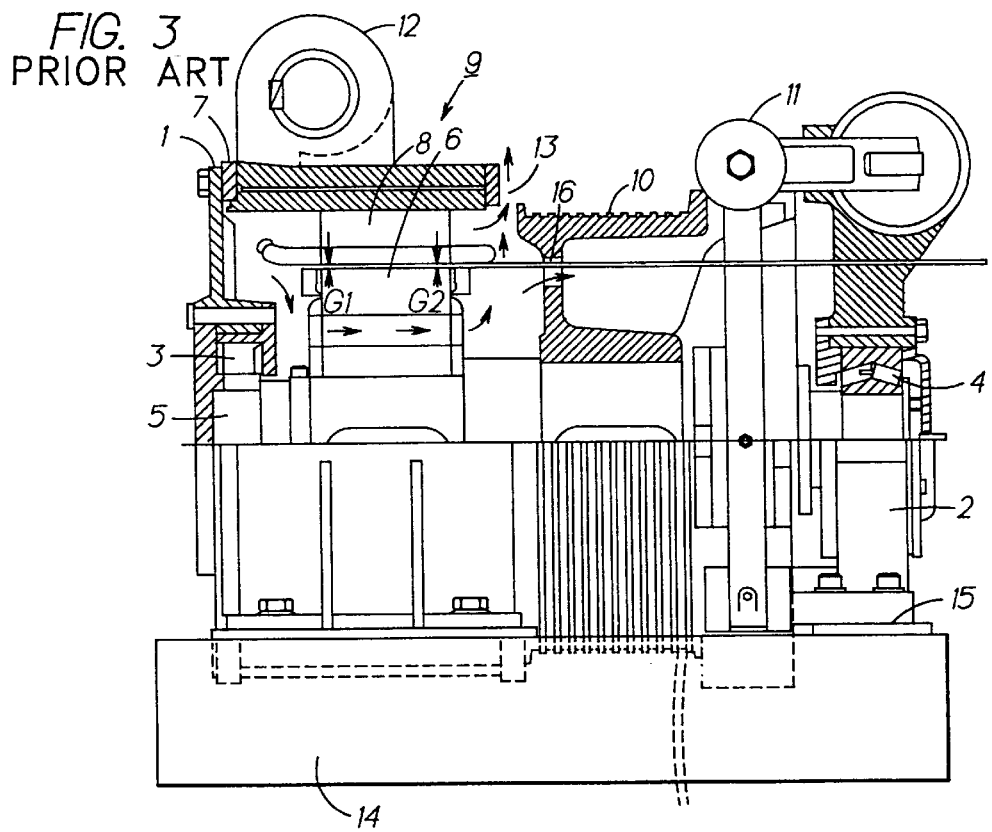
FIG. 3 is a front cross section of a conventional traction machine motor.
Figure 4:
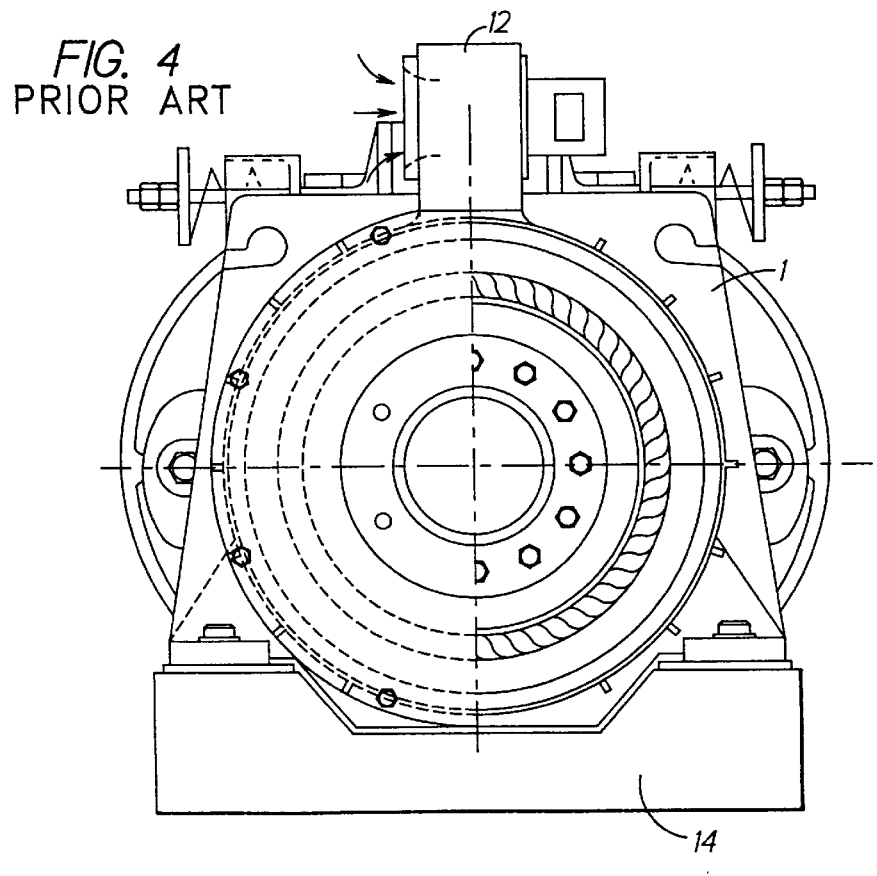
FIG. 4 is left side cross section of a conventional traction machine motor.
Figure 5:
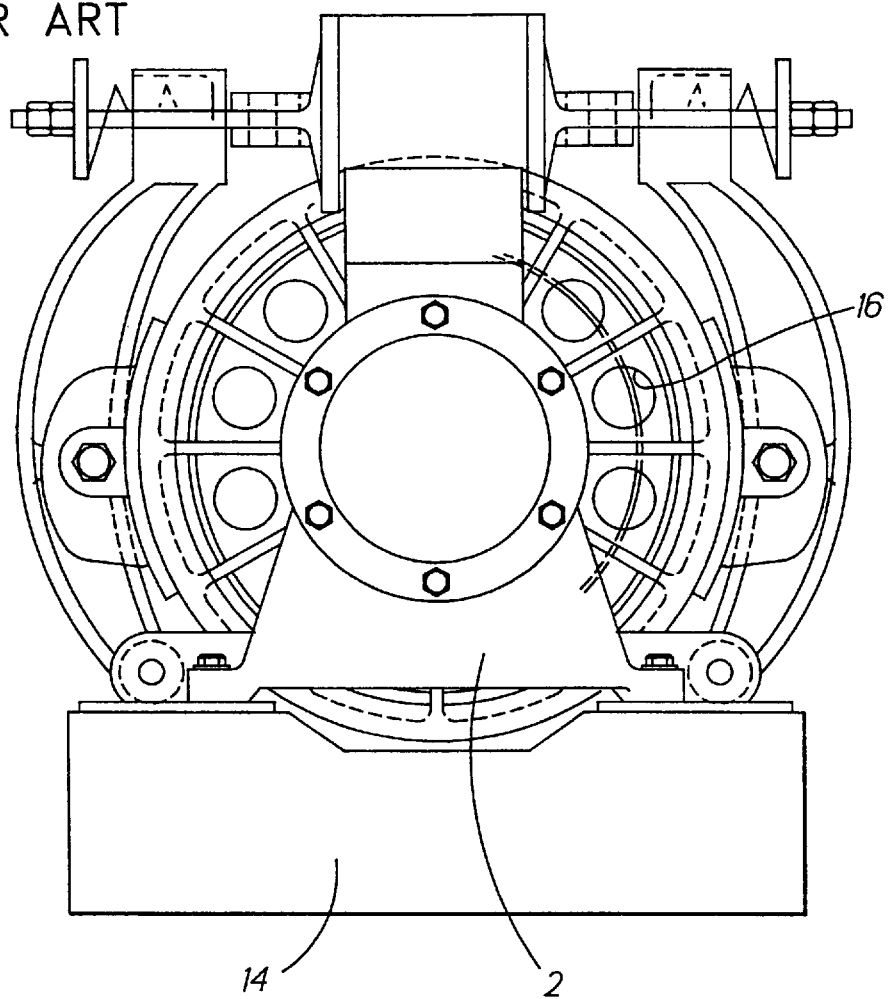
FIG. 5 is a right side cross section of a conventional traction machine motor.

A traction machine motor based on the present invention is shown in FIGS. 1–2. In the present invention, if gap ($G_5$) at the portion where motor frame (7) and driving sheave (10) face each other is measured in the circumferential direction, rather than measuring gap ($G_4$) between rotor (6) and stator (8) in the circumferential direction as shown in FIG. 1, the same results will be obtained as if gap ($G_4$) had been measured. It was decided not to form an exhaust hole between motor frame (7) and driving sheave (10) in order to improve the efficiency of this.

Spigot joint (18) is formed as an arcuate section at the end of motor frame (7) along an arc concentric with the center axis of rotary shaft (5), while arcuate section (19) is formed as an arcuate section at the end of driving sheave (10) along an arc concentric with the center axis of rotary shaft (5). Thus, a small gap ($G_5$) of several millimeters is formed between spigot joint (18) and arcuate section (19).

The size of gap ($G_5$) is set to be several millimeters because accurate measurement is not possible when gap ($G_5$) is made too large, but when this is done, it is not possible to use the opening between motor frame (7) and driving sheave (10) as an exhaust hole for cooling as is conventionally done.

For this reason, the cooling method has been improved by the present invention as described below. As shown in FIG. 2, intake hole (20) and exhaust hole (21) are formed at the position where long line (23) going from left to right, which is a line perpendicular to rotary shaft (5), intersects motor frame (7), and fan (22), which forces in outside air, is provided at the position of intake hole (20).

Because ($G_5$) can be measured without measuring gap ($G_4$) as described above, the conventional measuring holes formed in driving sheave (10) become unnecessary and are omitted.

The operation of the traction machine motor based on the present invention will be explained next. To adjust the height of bearing stand (2), gap ($G_5$) is measured along the circumferential direction, rather than measuring gap ($G_4$) as would have been done conventionally. Then, the thickness of liner (15) is changed according to the results of the measurement, and the size of gap ($G_5$) is adjusted along the circumferential direction to give the same value. To prevent gap ($G_5$) from being biased in the circumferential direction, it is first visually measured to see that there is no large bias. Then it is precisely measured using a gap gauge, and the height of bearing stand (2) is adjusted so that there is absolutely no bias in gap ($G_5$).

In order to cool motor (9), when fan (22) in FIG. 2 turns, outside air is drawn into motor frame (7) through intake hole (20), the outside air separates, as indicated by the arrows, to cool stator (8) and rotor (6), and then is discharged through exhaust hole (21). When outside air flows along the center axis as in the conventional manner, because the cross sectional area of the airflow path changes in a complex manner, portions where flow is smooth and portions where it is not smooth will be created, and there may be nonuniform cooling. With the traction machine motor based on the present invention, though, the air will flow smoothly and uniformly through the entire interior of motor frame (7), as indicated by the arrows in FIG. 2. Thus, the cooling efficiency of motor (9) will be higher than conventionally.

Note that in this application example, a line perpendicular to the rotary shaft in the cooling apparatus that extended in the horizontal direction was described, but the line can also be made along the vertical orientation or in a diagonal orientation. In addition, for the motor frame, the inside of an arcuate was cut out while for the driving shaft, the outside of an arc was cut out, but the cut-out portions could be reversed, or the outsides of both could be cut out.

As is clear from the explanation above, with a traction machine motor based on the present invention, arcuate sections concentric with the rotary shaft are formed in the portions where the motor frame and the driving sheave face each other, and the measurement will be easy where the bias in the arcuate spacing between the arcuate sections may be measured, rather than measuring the bias in the gap between motor stator and rotor in the circumferential direction. In addition, gap bias can be visually observed externally, so the height of the bearing stand can be adjusted by roughly sighting the gap, and then bias in the gap can be precisely measured using a gap gauge and the bearing stand height can be precisely adjusted in a short time.

Additionally, an intake hole and an exhaust hole for cooling are provided on a line perpendicular to the rotary shaft, so that measuring the gap can be made more efficient by making the gap between the motor frame and the driving sheave smaller. In addition, by having outside air flow at right angles to the rotary shaft, cooling efficiency will be better than conventionally.

Various changes to the above description may be made without departing from the spirit and scope of the present invention as would be obvious to one of ordinary skill in the art of the present invention.

What is claimed is:

1. A traction machine motor comprising:

a rotating shaft having a first end and a second end, said rotating shaft rotating about a rotational axis;

a bracket for supporting the first end of said rotating shaft;

a bearing stand for supporting the second end of said rotating shaft, said bearing stand having a first end;

a rotor disposed on said rotating shaft;

a frame surrounding said rotor, said frame having a first arcuate section formed therein;

a stator disposed inside said frame;

a drive sheave disposed between said rotor and said bearing stand, said drive sheave having a second arcuate section formed therein opposite the first arcuate section of said frame; and a cooling device for cooling said traction machine motor, said cooling device having an intake opening and an exhaust opening both of which being directed perpendicular to the rotational axis of said rotating shaft and directing cooling air flow solely perpendicular to the rotational axis of said shaft.

2. The traction machine motor as recited in claim 1 further comprising a cooling fan disposed on the intake opening of said cooling device.

3. The traction machine motor as recited in claim 1 further comprising a cooling fan disposed on the exhaust opening of said cooling device.

* * * * *